March 31, 1936.  N. S. FOCHT  2,035,954
SHOCK ABSORBER
Filed Sept. 27, 1933
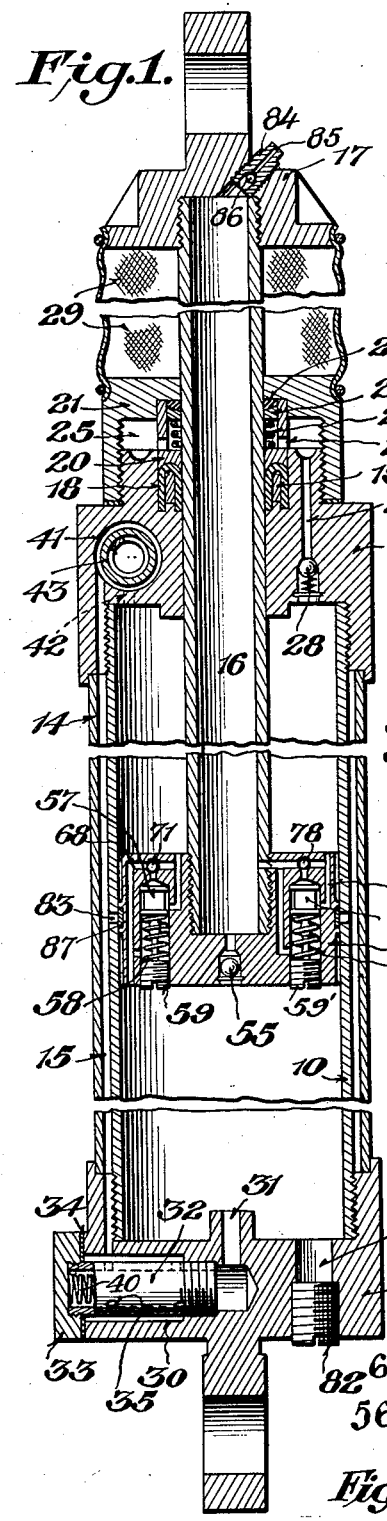
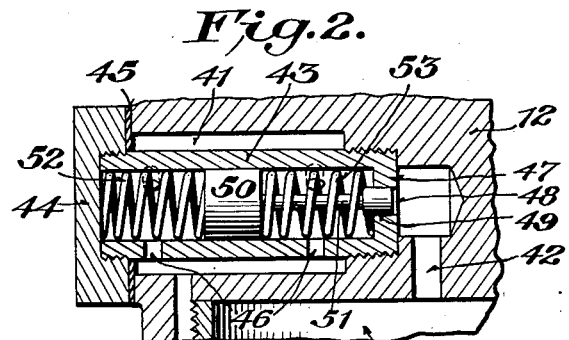
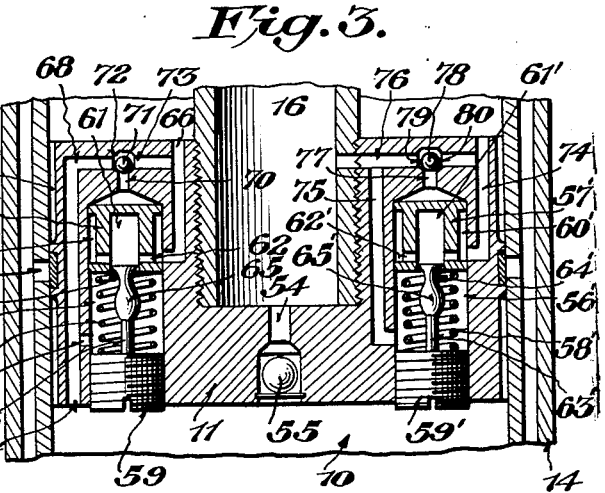
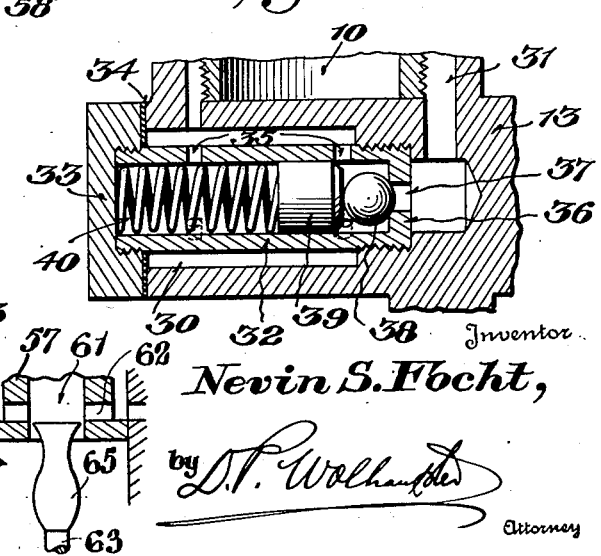
Inventor
Nevin S. Focht,
by D. P. Wolhaupter
Attorney Patented Mar. 31, 1936

2,035,954

UNITED STATES PATENT OFFICE 2,035,954

SHOCK ABSORBER

Nevin S. Focht, Reading, Pa.

Application September 27, 1933, Serial No. 691,211

17 Claims. (Cl. 188—88)

This invention relates to shock absorbers for use on motor vehicles, airplanes, industrial machines, and the like, and has generally in view to provide a hydraulic shock absorber of the strut type operating on the general principle and possessing the principal advantages of the vane type shock absorber illustrated, described and claimed in my copending application, Serial No. 629,377.

Other objects of the invention are: to provide a strut type shock absorber which not only possesses the principal advantages of the vane shock absorber described and claimed in my copending application, Serial No. 629,377, but which is relatively easy to construct and of relatively low production cost; which is strong and durable; which may easily be applied and equally as easily removed for servicing; which includes novel means for returning to the working cylinder thereof any liquid which may escape from said cylinder along the piston rod; which includes a hollow piston rod serving as a liquid reservoir and novel means to control the flow of liquid to and from said reservoir from the cylinder spaces at opposite ends of the piston; which includes novel valves for controlling the flow of liquid between the spaces at opposite ends of the piston, and which includes novel valve combinations to assure desired control of shocks under all conditions of operation of the shock absorber.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the drawing, wherein like characters of reference denote corresponding parts in the different views:—

Figure 1 is a central, longitudinal section through a shock absorber constructed in accordance with the invention.

Figure 2 is a sectional view through one of the valves of the shock absorber.

Figure 3 is an enlarged sectional view through the piston and the valves carried thereby.

Figure 4 is a sectional view through another of the valves of the shock absorbers; and Figure 5 is an enlarged detail sectional view of one of the spool valves and its related metering pin.

Referring to the drawing in detail, it will be observed that the present shock absorber, according to the practical embodiment thereof illustrated in the present instance, includes, essentially, a working cylinder 10 and a piston 11 for connection, respectively, with a pair of relatively movable elements such, for example, as the axle and the chassis of a motor vehicle.

Although the shock absorber may be disposed horizontally, or at an inclination to the horizontal, or vertically, it will, in most instances, be disposed vertically or substantiallly vertically. Accordingly, in order to simplify the description, it will be assumed to be disposed vertically.

Threaded on and closing the upper and the lower ends of the cylinder 10 are heads 12 and 13, respectively, and between these heads is clamped a tube 14 which is of larger diameter than said cylinder and which surrounds the same. Thereby a liquid space 15 is provided between said cylinder and said tube.

Threaded into the piston 11 is a hollow piston rod 16 which extends through a central bore in the upper head 12 and which, at its upper end, has threaded thereon a combined closure cap and attachment element 17 for connection with one of the elements, such as the axle or chassis of a vehicle, movements of which are to be controlled by the shock absorber. The lower head 13 is suitably formed for connection with the other of the elements movements of which are to be controlled by the shock absorber.

Surrounding the piston rod 16 is a packing ring 18 of leather or other suitable material which is of inverted U-shape in cross-section and which is disposed within an enlarged upper portion of the piston rod accommodating bore in the upper head 12. Between the respective side portions of said packing ring is disposed a ring 19 of rubber or other suitable material which is maintained compressed and which, by its constant tendency to expand, maintains the ring 18 in snug engagement with the piston rod 16.

The packing ring 18 is held within the enlargement of the piston rod accommodating bore in the head 12 by means of a metal ring 20 which seats against the top of said ring 18 and which, at its upper end, is engaged by a cap 21 which is threaded on the head 12. By screwing the cap 21 downwardly, pressure may be exerted through the ring 20 onto the packing ring 18 to expand the latter against the piston rod 16.

The upper end portion of the ring 20 is counterbored and has arranged therein a coil spring 22 which seats at its lower end on the shoulder defining the bottom of the counterbore and which has superimposed thereon a metal ring 23 above which is disposed, in surrounding relationship to the piston rod 16, a sealing ring 24 of felt or other suitable material. When the cap 21 is threaded onto the head 12 the spring 22 is compressed and, therefore, because of the constant tendency of said spring to expand and to force the sealing ring 24 upwardly against the top wall of the cap 21, said sealing ring is maintained under an expansive pressure in sealing engagement with the piston rod 16.

Between the top of the head 12 and the cap 21 is a space or chamber 25 with which the counterbored portion of the ring 20 is in communication through openings 26 formed through the side wall of said ring. Moreover, a duct 27 formed through the head 12 provides communication between the chamber 25 and the cylinder 10 under the control of a check valve 28 which closes in the direction of the chamber and opens in the direction of the cylinder. Thus, any liquid which may escape from the cylinder by the piston rod may collect in the chamber 25 from which it is free to return to the cylinder through the duct 27 upon the occurrence of relative inward movements of the cylinder and piston.

It is only when liquid within the upper part of the cylinder is subjected to abnormally high pressures that the packing ring 18 may permit the escape of any liquid by the piston rod 16, and even under such conditions the seal afforded by the ring 18 assures that only a relatively small amount of liquid at most may escape from the cylinder. The chamber 25 is of ample capacity to accommodate any liquid which may escape by the packing 18. Consequently, the sealing ring 24 is not subjected to high liquid pressures and liquid therefore is prevented by said sealing ring from escaping through the piston rod accommodating bore in the cap 21.

As illustrated in Fig. 1, a boot 29 of leather or other suitable material is disposed in surrounding relationship to the piston rod 16 above the cap 21 and below the element 17 and is securely fastened at its upper and lower ends to said element and said cap, respectively. Thus, all foreign matter such as might result in scoring of the piston rod, is excluded therefrom.

The lower head 13 is provided with a bore 30 which opens through the side of said head and which, at its inner end, is of reduced diameter and threaded and in communication with the lower end of the cylinder 10 through a duct 31. A cylindrical valve casing 32 is disposed within the bore 30 and at its inner end is threaded into the reduced inner end portion of said bore. On the outer end of said valve casing is threaded a closure cap 33, and between this closure cap and the outer face of the head 13 is interposed a gasket 34 against which said cap is tightly drawn. Thus, escape of liquid from the bore 30 is effectively prevented.

The bore 30 is of greater diameter, except at its inner reduced end, than the valve casing 32, and said bore is, moreover, in communication with the space 15 between the cylinder 10 and the tube 14 and also in communication with the interior of the valve casing through openings 35 in the side wall of said casing.

A wall 36 closes the inner end of the valve casing 32 and through this wall is formed a port 37 affording communication between the duct 31 and the interior of the valve casing under the control of a ball valve 38 which is disposed within the valve casing for cooperation with a seat surrounding the port 37.

There are two sets of the openings 35 spaced longitudinally of the valve casing 32, and slidable within the valve casing between these two sets of openings is a piston 39. Between the closure cap 33 and said piston 39 is a normally compressed coil spring 40 which, by its constant tendency to expand, tends constantly to move the piston 39 inwardly against the valve 38 and to maintain said valve seated in closing relationship to the port 37.

As in the case of the lower head 13, the upper head 12 is provided with a bore 41 which opens through the side of said head and which, at its inner end, is of reduced diameter and threaded and in communication with the upper end of the cylinder 10 through a duct 42. A cylindrical valve casing 43 is disposed within the bore 41 and at its inner end is threaded into the reduced inner end portion of said bore. On the outer end of said valve casing is threaded a closure cap 44, and between this closure cap and the outer face of the head 12 is interposed a gasket 45 against which said cap is tightly drawn.

The bore 41 is of greater diameter, except at its inner reduced end, than the valve casing 43, and said bore is, moreover, in communication with the space 15 between the cylinder 10 and the tube 14 and also in communication with the interior of said valve casing 43 through openings 46 in the side wall thereof.

A wall 47 closes the inner end of the valve casing 41 and through this wall is formed a port 48 affording communication between the duct 42 and the interior of said valve casing under the control of a piston type valve 49 which snugly fits said port 48 and is slidable therethrough.

There are two sets of the openings 46 spaced longitudinally of the valve casing 41, and slidable within said valve casing between these two sets of openings is a piston 50 which is connected with the valve 49 by a rod 51. Between the closure cap 44 and the piston 50 is a coil spring 52, while between said piston and the wall 47 at the inner end of the valve casing is a coil spring 53, which springs cooperate to hold the valve 49 normally in a position closing the port 48.

Formed through the lower portion of the piston 11 is a duct 54 which provides communication between the interior of the hollow piston rod 16 and the cylinder 10 below the piston under the control of a check valve 55 which closes in the direction of the hollow piston.

Formed in the piston 11, preferably at diametrically opposite points, is a pair of valve chambers 56, 56' which open through the bottom of the piston and which, at their upper ends, terminate below the top of the piston. Within the upper portions of said valve chambers are slidably mounted spool valves 57, 57', respectively, which are urged normally to the upper ends of said valve chambers by coil springs 58, 58', respectively, which are interposed between said valves and closure plugs 59, 59', respectively, threaded into the lower ends of the valve chambers.

The spool valves 57, 57' are provided with external annular channels 60, 60', respectively, and with central bores 61, 61', respectively, which are closed at their upper ends and which open at their lower ends through the bottoms of said valves. Ports 62, 62' provide communication between the annular channels 60, 60' and the central bores of the valves, respectively.

Carried by and extending upwardly from the plugs 59, 59' are metering pins 63, 63', respectively, the upper portions of which are disposed in the lower end portions of the bores 61, 61', respectively, when the spool valves 57, 57' are at their uppermost limits of movement within the valve chambers 56, 56'. From their upper ends downwardly, the metering pins 63, 63' first are of progressively and quickly decreasing diameter as indicated at 64, 64', respectively, and then of progressively and more slowly increasing diameter to portions of greatest diameter as indicated at 65, 65', respectively, the said portions 65, 65' of greatest diameter being spaced below the tops of the pins at distances such that, upon downward movement of the spool valves, they enter the lower ends of the bores 61, 61' of said valves prior to the upper ends of said pins reaching the upper ends of said bores. The upper end portions and the portions 65, 65' of the pins 63, 63' preferably are of equal or substantially equal diameter and are of slightly less diameter than the bores 61, 61', so that in any position of either valve 57 or 57' relative to its pin a slight clearance space for the flow of liquid is provided between the pin and the side wall of the pin accommodating bore in the valve.

A vertical passageway 66 formed in the piston 11 opens at its upper end through the top of said piston and at its lower end opens into the valve chamber 56 at a point near the bottom of the annular channel 60 around the spool valve 57 when said valve is in its uppermost position. Another vertical passageway 67 formed in the piston opens at its lower end through the bottom of said piston and at its upper end is connected by a horizontal passageway 68 with the passageway 66. A duct 69 provides communication between the passageway 67 and the lower end portion of the valve chamber 56, and a duct 70 provides communication between the passageway 68 and the upper end of the valve chamber 56. In a suitable enlargement of the passageway 68 is disposed a ball valve 71, and at opposite sides of the duct 70 are valve seats 72 and 73 with either of which said valve 71 may engage to control flow of liquid through the passageway 68 and the duct 70.

A vertical passageway 74 formed in the piston 11 opens at its upper end through the top of the piston and at its lower end opens into the valve chamber 56' at a point near the bottom of the annular channel 60' around the spool valve 57' when said valve is in its uppermost position. Another vertical passageway 75 formed in the piston 11 opens at its lower end into the valve chamber 56' near the lower end thereof and at its upper end is connected by a horizontal passageway 76 with the passageway 74 and with the interior of the hollow piston rod 16. A duct 77 connects the passageway 76 with the upper end of the valve chamber 56'. In an enlargement of the passageway 76 is disposed a ball valve 78, and at opposite sides of the duct 77 are valve seats 79 and 80 with either of which the valve 78 may engage to control flow of liquid through the passageway 76 and the duct 77.

A filling opening 81 is formed through the lower head 13 and normally is closed by a plug 82, and in this connection it will be observed that said filling opening is so located that a screw driver may be inserted therethrough for the purpose of rotating the plugs 59, 59' to regulate the strength of the springs 58, 58'.

The spring 58 is somewhat stronger than the spring 40, and the spring 58' is somewhat stronger than the springs 58 and 53. Also, the spring 58 is somewhat stronger than the spring 52 and somewhat weaker than the spring 53, which latter spring is, of course, stronger than the spring 52.

Normally the piston 11 is disposed substantially midway between the upper and the lower ends of the cylinder 10, and formed through the wall of the cylinder 10 are ports 83 which are disposed to provide communication between the space 15 and the portion of the cylinder 10 above the piston 11 when either the piston is moved downwardly or the cylinder is moved upwardly from its normal position, and to provide communication between the space 15 and the portion of the cylinder below the piston 11 when either the piston is moved upwardly or the cylinder is moved downwardly.

Assuming that the shock absorber is charged with oil or other liquid, that it is interposed between the axle and the spring supported chassis or body of a motor vehicle, for example, and that the normal position of the piston 11 is approximately midway between the ends of the cylinder 11, it has four distinct phases of operation; viz., (1) "compression above normal" or that phase corresponding to compression of the vehicle spring above its normal compression as when an obstruction in the roadway is encountered and the cylinder 10 is moved upwardly relative to the piston 11; (2) "rebound above normal" or that phase corresponding to downward movement of the cylinder relative to the piston following compression of the vehicle spring above its normal compression; (3) "rebound below normal" or that phase corresponding to deflex action of the vehicle spring as when a depression in the roadway is encountered and the cylinder moves downwardly relative to the piston 11; and (4) "compression below normal" or upward movement of the cylinder relative to the piston following the "rebound below normal" phase of operation and corresponding to return of the vehicle spring to its normal position following reflex action thereof.

As the "compression above normal" phase of operation takes place, the piston 11 and the cylinder head 13 move relatively towards each other. As soon as this movement is initiated the liquid below the piston is subjected to pressure and the valve 55 closes preventing flow of liquid from the cylinder space below the piston through the duct 54 into the hollow piston 16. Upon building up of the pressure to such an extent as to overcome the force of the spring 40, the valve 38 opens and liquid flows through the duct 37, through the valve casing 32, through the openings 35 in said valve casing into the bore 30, from said bore into the space 15, and from said space through the ports 83 into the cylinder 10 above the piston 11. Obviously the rate of flow depends upon the strength of the spring 40, so that the relative inward movement of the piston and the head 13 is cushioned. During this phase of operation the valve 49 is inoperative because the path of least resistance for flow of liquid from the space 15 into the cylinder 10 above the piston 11 is through the ports 83. Also, during this phase of operation, the spool valve 57 does not function under ordinary conditions due to its spring 58 being stronger than the spring 40. If, however, the relative movement of the piston 11 and the head 13 towards each other is very sudden and of such magnitude as to generate an exceptionally high pressure in the lower end of the cylinder 10; that is, a pressure such that the flow of liquid by the valve 38 cannot take place sufficiently rapidly to permit relative movement of the piston 11 and the head 13 towards each other at a rate properly to dampen the shock, the spool valve 57 then operates as a relief valve to permit flow of liquid through the piston into the cylinder above the piston. That is to say, the pressure of the liquid in the passageway 67 moves the ball valve 71 against its seat 73 and flow of liquid through the passageway 68 directly to the cylinder space above the piston is prevented. However, the passageway 67 then is in communication through the duct 70 with the valve chamber 56 above the spool valve 57, and through the duct 69 with said valve chamber below said spool valve. Due to the slight clearance between the upper end portion of the pin 63 and the side wall of the bore 61 the pressure of the liquid below the spool valve 57 is relieved by way of the ports 62, the annular channel 60 and the passageway 66 and as a consequence the spool valve is moved downwardly at a rate and by an amount depending upon the pressure of the liquid, the strength of the spring 58 and the width of the clearance space between the pin 63 and the side wall of the bore 61. As the spool valve moves downwardly the ports 62 move below the tops of the pin 65 into alinement with the portion 64 of said pin of reduced diameter. Liquid then flows more freely from the bottom portion of the valve chamber 56 into the bore 61 and from said bore through the ports 62 and the annular channel 60 into the passageway 66 and through said passageway to the cylinder space above the piston. Obviously, continued downward movement of the spool valve 57 after the ports 62 are disposed below the top of the pin 63, results in a progressive restriction of the flow of liquid around the pin 63 into the bore 61 due to the bottom of the spool valve approaching the portion 65 of the pin which is of enlarged diameter. Consequently, when the spool valve 57 operates, it functions initially to permit a considerable flow of liquid and thereafter to gradually throttle or restrict the liquid flow, thereby to permit desired quick initial movement of the piston 11 and the head 13 towards each other and subsequently to gradually check such movement.

Inasmuch as the piston rod 16 occupies space within the cylinder 10 above the piston 11, said cylinder space is of less volume than the cylinder space below the piston. Consequently, relative movement of the piston 11 and the head 13 towards each other results in more liquid being forced from the cylinder space below the piston into the cylinder space above the piston than the latter space can accommodate. Accordingly, the pressure of the liquid in the cylinder space above the piston acts on the ball valve 78 to move said valve against its seat 79 and to move the spool valve 57' downwardly, whereby flow of liquid under the metering control of the pin 63' is permitted to take place through the passageway 74, through the annular channel 60' and the ducts 62' of said spool valve into the valve chamber 56' below said spool valve and thence through the pasageways 75 and 76 into the hollow piston 16. Thus, the hollow piston serves as a reservoir to receive excess liquid delivered to the cylinder 10 above the piston 11 during the "compression above normal" phase of operation of the shock absorber.

Following the "compression above normal" phase of operation, the "rebound above normal" phase of operation occurs during which the piston 11 and the head 13 move relatively apart. As this phase of operation is initiated the liquid above the piston 11 is subjected to pressure and is forced through the ports 83 into the space 15. The valve 38 now being closed by the spring 40, flow of liquid from the space 15 through the duct 31 into the bottom of the cylinder 10 is prevented. The spring 53 of the valve 49 being stronger than the spring 58 of the spool valve 57, the valve 49 remains closed. Also, the spool valve 57' remains in its uppermost position due to its spring 58' being stronger than the spring 58, and the ball valve 78 moves against its seat 79 and prevents flow of liquid from the cylinder space above the piston into the hollow piston rod 16. Therefore, the only remaining avenue of escape for the liquid from the cylinder space above the piston is through the piston under the control of the spool valve 57. The pressure of the liquid moves the ball valve 71 against its seat 72. Direct flow of liquid through the passageways 68, 67 to the cylinder space below the piston thereby is prevented. However, the pressure of the liquid acting on the top of the spool valve moves said valve downwardly, with the result that liquid is permitted to flow through the passageway 66, through the channel 60 and the ducts 62 of the spool valve into the bore 61 thereof and past the metering pin 63 into the valve chamber below the spool valve and thence through the duct 69 and the lower end of the passageway 67 into the cylinder space below the piston 11. The spool valve 57 acts in the same way during the "rebound above normal" phase of operation as described with reference to the compression above normal phase of operation. Therefore, the rebound above normal relative movement of the cylinder and piston is gradually checked. During the "rebound above normal" phase of operation liquid obviously is not supplied in sufficient quantity from the cylinder space above the piston to the cylinder space below the piston to maintain the latter space filled with liquid. Therefore, the valve 55 opens under the influence of gravity and due to the tendency of a vacuum condition to form in the cylinder space below the piston, liquid flows from the hollow piston rod into the cylinder space below the piston to compensate for the difference in volume between the cylinder spaces above and below the piston.

The third phase of operation of the shock absorber is "rebound below normal" during which the piston 11 and the head 12 move relatively towards each other from their normal relative positions. As this phase of operation is initiated the liquid within the cylinder 10 above the piston 11 is subjected to pressure and due to the spring 52 being weaker than the spring 58, the spool valve 57 remains in its uppermost position and the ball valve 71 closes against its seat 72, thereby preventing flow of liquid through the passageway 66. The spring 58' also being stronger than the spring 52, the spool valve 57' remains in uppermost position and the ball valve 78 moves against its seat 79, thereby preventing flow of liquid into the hollow piston rod. Also, the valve 28 closes. Consequently, the pressure of the liquid against the valve 49 results in opening of said valve against the spring 52 and flow of liquid from the cylinder space above the piston through the duct 42, through the port 48 into the valve casing 43, from said valve casing through the openings 46 thereof into the bore 41, from said bore into the space 15, and from said space 15 through the ports 83 into the cylinder space below the piston, the valve 55 again opening to admit oil from the hollow piston rod to the cylinder space below the piston to compensate for the deficiency in supply of liquid to said space from the space above the piston. Thus, "rebound below normal" relative movement of the cylinder and piston is checked according to the strength of the spring 52.

The fourth phase of operation is "compression below normal" during which the piston 11 and the head 12 move relatively apart following the rebound below normal phase of operation. As this phase of operation is initiated the liquid below the piston is subjected to pressure and the valve 55 closes. The liquid then tends to flow through the passageway 67 past the spool valve 57 into the cylinder space above the piston, and also to flow through the ports 83 and the space 15 to the valve casing 43 and through the latter and its port 48 to the duct 42 into the cylinder space above the piston. The spring 53 being stronger than the spring 58, the valve 49 remains closed and the liquid flows through the passageways 67, 66 from the cylinder space below the piston to the cylinder space thereabove under the control of the spool valve 57 and the metering pin 63 in the same manner as described in connection with the "compression above normal" phase of operation of the shock absorber. If, however, the pressure of the liquid is exceptionally high during the "compression below normal" phase of operation, the valve 49 is forced open against the force of the spring 53 and the pressure is gradually relieved, thereby resulting in a gentle return of the cylinder and the piston to their normal relative positions.

As in the case of the "compression above normal" phase of operation, more liquid will be delivered from the cylinder space below the piston to the cylinder space above the piston during the "compression below normal" phase of operation than can be accommodated by the last mentioned space. The check valve 78 and the spool valve 57' then will act in the same manner as described in connection with the "compression above normal" phase of operation to admit liquid from the cylinder space above the piston to the hollow piston reservoir.

As will be observed by reference to Fig. 1, the cap 17 is provided with an opening which communicates with the interior of the hollow piston rod 16 and which has threaded therein a plug 84 having formed therethrough a duct 85 which is controlled by an inwardly opening check valve 86. By removing the plug 84, the hollow piston rod may readily be filled with liquid, and when the shock absorber, including the hollow piston rod, is charged with liquid and the shock absorber is in operation, the check valve 86 or so-called "breather" valve provides for admission of air to the hollow piston rod to permit flow of liquid therefrom during upward movements of the piston.

Regarding the piston 11, it will be observed that the same is provided with an annular packing band 87 of leather or other suitable material which covers the ports 83 when the piston and the cylinder are in their normal relative positions, and that the piston is recessed as at 88 so that immediately upon the occurrence of relative movement between the piston and the cylinder in either direction, the ports 83 are uncovered to provide communication between the space 15 and the cylinder to one side or the other of the piston as the case may be, depending upon the direction of relative movement between the piston and the cylinder.

Regarding the metering pins 63, 63' and assuming that the shock absorber is designed for use on a motor vehicle, it is pointed out that the portions 64, 65 and 64', 65' of said pins are so formed, and the springs 58, 58' are of such strength that within a certain predetermined high range of speed of the vehicle, a speed range in the neighborhood of fifty miles per hour for example, which produces high velocities of relative movement between the cylinder and the piston, the spool valves 57, 57' reach the greatest amount of cut-off of metering pin control. That is to say, at a vehicle speed of approximately fifty miles per nour for example and corresponding pressure of the liquid generated by the relatively high velocity relative movements between the cylinder and the piston, the lower end portions of the spool valves 57, 57' become substantially alined with the portions 65, 65' of greatest diameter of the pins 63, 63' thereby to a very considerable extent cutting off flow of liquid through the bores 61, 61'. Thus, at speeds which exceed the predetermined high speed range the spool valves move still farther downwardly relative to the pins 63, 63' under the higher liquid pressure generated, and because of the decreasing diameter of the pins 63, 63' in the direction of the plugs 59, 59' from the portions of said pins which are of greatest diameter, the flow of a greater amount of liquid through the bores 61, 61' is permitted, the amount of permissible flow under such condition increasing with the speed of the vehicle and increase in the pressure of the liquid. Thus, excessive pressures with consequent overcontrol of shocks are prevented from developing at higher vehicle speeds and the metering of the liquid is so controlled by the pins 63, 63' as correctly to neutralize the forces to be controlled.

From the foregoing description considered in connection with the accompanying drawing it is believed that the construction, operation and advantages of the invention will be clearly understood. It is desired to point out, however, that while only a single specific form of the invention has been illustrated and described, the invention obviously is readily capable of embodiment in specifically different mechanical constructions within the spirit and scope thereof as defined in the appended claims.

I claim:—

1. A hydraulic shock absorber of the strut type comprising a cylinder, heads closing the ends of said cylinder, a piston within said cylinder, a hollow piston rod extending from said piston through one of the heads, a pair of valves carried by the piston, one of said valves controlling flow of liquid between the cylinder spaces at opposite ends of the piston, the other of said valves controlling flow of liquid into the hollow piston rod from the cylinder space through which the piston rod extends, and a check valve permitting flow of liquid from the hollow piston rod to the other cylinder space and preventing flow of liquid from the latter cylinder space into said hollow piston rod.

2. A hydraulic shock absorber of the strut type comprising a cylinder, heads closing the ends of said cylinder, a piston within said cylinder, a hollow piston rod extending from said piston through one of the heads, valve means controlling flow of liquid between the cylinder spaces at opposite ends of the piston, means for the flow of liquid into the hollow piston from the cylinder space at the end of the piston through which the piston rod extends, said last named means being operable in response to variations in the pressure of the liquid within the last mentioned cylinder space to regulate the rate of flow of the liquid from said space into the hollow piston rod, and means for the flow of liquid from the hollow piston rod into the cylinder space at the other end of the piston.

3. A hydraulic shock absorber comprising a cylinder, heads closing the ends of said cylinder, a piston within said cylinder, a hollow piston rod extending from said piston through one of the heads, valve means controlling flow of liquid between the cylinder spaces at opposite ends of the piston, a valve controlling flow of liquid into the hollow piston from the cylinder space at the end of the piston through which the piston rod extends, said valve being operable to admit liquid to the hollow piston only under pressure higher than is necessary to actuate the valve means controlling flow of liquid between the cylinder spaces at opposite ends of the piston, and a check valve controlling flow of liquid from the hollow piston into the cylinder space at the end of the piston opposite the end thereof from which the piston rod extends.

4. A hydraulic shock absorber comprising a cylinder, heads closing the ends of said cylinder, a piston within the cylinder, a hollow piston rod extending from the piston through one of the heads, means providing a passageway affording communication between the ends of the cylinder, said passageway being in communication intermediate its ends with the cylinder intermediate the ends of the latter, a spring closed valve permitting flow of liquid from one end of the cylinder into said passageway and preventing flow of liquid in the opposite direction, a second valve permitting flow of liquid in both directions between the other end of the cylinder and said passageway, spring means tending constantly to move said second mentioned valve to a closed position against flow of liquid in either direction therethrough, a valve permitting flow of liquid into the hollow piston rod from the cylinder space through which the piston rod extends and denying flow of liquid from said hollow piston rod into said space, a spring tending constantly to close said last mentioned valve and requiring a higher pressure of the liquid to open the same than is required to open either of the first mentioned valves, and a valve permitting flow of liquid from the hollow piston into the cylinder space at the end of the piston opposite the end thereof from which the piston rod extends and denying flow of liquid into the hollow piston rod from the cylinder space at the end of the piston opposite the end thereof from which the piston rod extends.

5. A hydraulic shock absorber as set forth in claim 4 including a normally closed valve carried by the piston and controlling flow of liquid in both directions between the cylinder spaces at opposite ends of the piston, and means whereby said valve opens only under a liquid pressure higher than the liquid pressure required to open the first mentioned valve.

6. In a device of the character described, a valve for controlling flow of liquid, said valve comprising a valve chamber, a spool valve slidable therein, said spool valve having an external annular channel and a central bore closed at one end and opening through the other end of the spool valve, said spool valve having ports providing communication between the annular channel and said bore, a fixed pin extending into the bore and at its free end substantially snugly fitting the bore, said pin being first of reduced diameter and then of increasing diameter from its free end, a casing surrounding the valve chamber and provided with liquid passages communicating with the annular channel and the chamber, respectively, and means whereby liquid attempting to flow through either of said passageways to the other passageway is directed against the spool valve in a manner to move the same inwardly relative to the pin and against the spring.

7. A hydraulic shock absorber as set forth in claim 2 in which a breather valve is provided to admit air to the hollow piston rod during times when liquid flows from said hollow piston rod.

8. A hydraulic shock absorber comprising a casing, a piston reciprocal within said casing and having a normal position between the ends thereof dividing the casing into separate pressure chambers, means providing communication between said chambers, a spring controlled valve operable upon movement of said piston from its normal position into one of said chambers to control flow of liquid from said chamber to the other chamber, a second spring controlled valve operable upon return movement of said piston to its normal position to control flow of liquid from the other chamber to the first mentioned chamber, a third spring controlled valve operable upon movement of the piston from its normal position into the second mentioned chamber to control flow of liquid from the latter chamber to the first mentioned chamber, means whereby said third valve also is operable upon return movement of the piston from the second mentioned chamber to its normal position to control flow of liquid from the first mentioned chamber to the second mentioned chamber, the control springs of said valves being of different relative strengths such that the first and second mentioned valves are caused to remain inoperative during the two last mentioned movements of the piston, the second and third valves are caused to remain inoperative during the first mentioned movement of the piston under normal conditions and whereby the second mentioned valve controls flow of liquid from the second mentioned chamber to the first mentioned chamber upon the sudden building up of pressure in the first mentioned chamber, and the first and third valves are caused to remain inoperative during the second mentioned movement of the piston.

9. A hydraulic shock absorber comprising a casing, a piston reciprocal within said casing and having a normal position between the ends thereof dividing the casing into separate pressure chambers, means providing a passageway affording communication between said chambers, port means blanked by said piston when the same is in its normal position and uncovered by said piston when the same is moved from its normal position into either pressure chamber, said port means when uncovered affording direct communication between said passageway and the chamber from which the piston is moved, a spring closed check valve operable upon movement of the piston into one of said chambers to control flow of liquid from said chamber through said passageway, a second valve operable upon return movement of the piston to its normal position to control flow of liquid from the second mentioned chamber to the first mentioned chamber, a third valve operable upon movement of said piston from its normal position into the second mentioned chamber to control flow of liquid from said second mentioned chamber through said passageway, and means whereby said third mentioned valve also controls flow of liquid from the first mentioned chamber through said passageway upon return movement of the piston from its last mentioned position to its normal position.

10. A hydraulic shock absorber as set forth in claim 9 in which the third mentioned valve is normally closed and opens both in the direction of the second mentioned chamber and in the direction of the passageway, and in which said third mentioned valve is constructed to be subjected at either side thereof to equal pressures during return movement of the piston to its normal position following movement thereof from its normal position into the first mentioned pressure chamber.

11. A hydraulic shock absorber comprising a casing, a piston reciprocal within said casing and having a normal position between the ends thereof dividing the casing into separate pressure chambers, means providing communication between said chambers, a valve operable upon movement of said piston from its normal position into one of said chambers to control flow of liquid from said chamber into the other chamber, and a second valve operable upon return movement of the piston to its normal position to control flow of liquid from the second mentioned chamber into the first mentioned chamber, said second mentioned valve including relatively movable liquid metering parts shaped for operation following a predetermined amount of relative movement of said parts under a rising pressure within the second mentioned chamber to progressively restrict the rate of flow of the liquid from said chamber to the first mentioned chamber.

12. A hydraulic shock absorber comprising a casing, a piston reciprocal within said casing and having a normal position between the ends thereof dividing the casing into separate pressure chambers, means providing communication between said chambers, a valve operable upon movement of said piston from its normal position into one of said chambers to control flow of liquid from said chamber into the other chamber, and a second valve operable upon return movement of the piston to its normal position to control flow of liquid from the second mentioned chamber into the first mentioned chamber, said second mentioned valve comprising an element arranged to be moved by a rise in pressure of the liquid within the second mentioned chamber, said element, and a metering element shaped and cooperating by reason of its shape with said first mentioned element to progressively restrict the rate of flow of the liquid through said valve from the second mentioned chamber to the first mentioned chamber following a predetermined amount of movement of said movable element relative to said metering element.

13. A hydraulic shock absorber comprising a casing, a piston reciprocal within said casing and having a normal position between the ends thereof dividing the casing into separate pressure chambers, means providing communication between said chambers, a valve operable upon movement of said piston from its normal position into one of said chambers to control flow of liquid from said chamber into the other chamber, and a second valve operable upon return movement of the piston to its normal position to control flow of liquid from the second mentioned chamber into the first mentioned chamber, said second mentioned valve comprising an element arranged to be moved by a rise in pressure of the liquid within the second mentioned chamber, spring means resisting such movement of said element, said element having a port formation, and an element having a metering formation cooperating with said port formation to control flow of liquid from the second mentioned chamber to the first mentioned chamber, one of said formations being of tapered form whereby the rate of flow of the liquid from the second mentioned chamber into the first mentioned chamber under a rising pressure of the liquid in the second mentioned chamber is progressively restricted following a predetermined amount of movement of said movable element relative to said metering element.

14. A hydraulic shock absorber comprising a casing, a piston reciprocal within said casing and having a normal position between the ends thereof dividing the casing into separate pressure chambers, means providing communication between said chambers, a valve operable upon movement of said piston from its normal position into one of said chambers to control flow of liquid from said chamber into the other chamber, a liquid reservoir, and a second valve operable to control flow of liquid from said second mentioned chamber into said reservoir, said second mentioned valve being constructed to operate only under a higher pressure than said first mentioned valve and being effective following a predetermined amount of operation thereof to progressively restrict the rate of flow of the liquid from the second mentioned chamber into the reservoir under a rising pressure within the second mentioned chambers.

15. A hydraulic shock absorber comprising a casing, a piston reciprocal within said casing and having a normal position between the ends thereof dividing the casing into separate pressure chambers, means providing communication between said chambers, a valve operable upon movement of said piston from its normal position into one of said chambers to control flow of liquid from said chamber into the other chamber, a liquid reservoir, and a second valve operable both upon movement of said piston into said first mentioned chamber and upon return movement of the piston to its normal position to control flow of liquid from the second mentioned chamber to said reservoir, said second mentioned valve being constructed to operate only under a higher pressure than said first mentioned valve and being effective following a predetermined amount of operation thereof to progressively restrict the rate of flow of the liquid from the second mentioned chamber into the reservoir under a rising pressure within the second mentioned chambers.

16. A hydraulic shock absorber comprising a cylinder, a piston reciprocal therein, and means including a valve for controlling flow of liquid between the cylinder spaces beyond opposite ends of the piston, said valve comprising a spool element having a longitudinally extending bore and a pin element operable within said bore, one of said elements being arranged to be moved longitudinally relative to the other by liquid pressure generated within the cylinder by movement of the piston therein, the spool element having transverse openings communicating with the bore thereof for flow of liquid through said spool element under the control of the pin element, and the pin element having spaced portions of relatively large diameter and an intermediate portion of smaller diameter merging into said portions of larger diameter, whereby under a rising pressure of the liquid the same flows first at a progressively increasing rate and then at a progressively decreasing rate.

17. A hydraulic shock absorber comprising a cylinder, a piston reciprocal therein, and means including a valve for controlling flow of liquid between the cylinder spaces beyond opposite ends of the piston, said valve comprising a spool element having a longitudinally extending bore and a pin element operable within said bore, the spool element having transverse openings communicating with the bore thereof for flow of liquid through said spool element under the control of said pin element, one of said elements being arranged to be moved longitudinally relative to the other by liquid pressure generated within the cylinder by movement of the piston therein, thereby to cause different portions of the pin element to aline with the transverse openings in the spool element, the portions of said pin element which successively aline with said transverse openings of the spool elements during continued relative longitudinal movement of the spool and pin elements in a given direction being, respectively and successively, of relatively large diameter, then of smaller diameter, then of larger diameter and then of smaller diameter, with adjacent portions merging into each other, whereby the flow of the liquid is first at a progressively increasing rate, then at a progressively decreasing rate and then at a progressively increasing rate.

NEVIN S. FOCHT.